Oct. 27, 1925.

P. H. BRACE

RECORDING CHRONOGRAPH

Filed March 23, 1921

WITNESSES:

INVENTOR
Porter H. Brace.
BY
ATTORNEY

Oct. 27, 1925.

P. H. BRACE 1,558,828

RECORDING CHRONOGRAPH

Filed March 23, 1921        2 Sheets-Sheet 2

WITNESSES:

INVENTOR
Porter H. Brace.
BY
ATTORNEY

Patented Oct. 27, 1925.

1,558,828

UNITED STATES PATENT OFFICE.

PORTER H. BRACE, OF WILKINSBURG, PENNSYLVANIA, ASSIGNOR TO WESTINGHOUSE ELECTRIC & MANUFACTURING COMPANY, A CORPORATION OF PENNSYLVANIA.

RECORDING CHRONOGRAPH.

Application filed March 23, 1921. Serial No. 454,818.

*To all whom it may concern:*

Be it known that I, PORTER H. BRACE, a citizen of the United States, and a resident of Wilkinsburg, in the county of Allegheny and State of Pennsylvania, have invented a new and useful Improvement in Recording Chronographs, of which the following is a specification.

My invention relates to recording chronographs and particularly to chronographs for automatically producing a record of the thermal analysis of a sample to be tested.

One object of my invention is to provide means for automatically recording the results of a thermal analysis made by the inverse-rate method.

Another object of my invention is to record the intervals of time required for the temperature of a heated body to attain a predetermined increment or decrement in temperature.

Another object of my invention is to provide a chronograph, of the above-indicated character, that shall be automatically adjusted to produce a record of the consecutive interval required for a predetermined increment or decrement of temperature upon the completion of the record of a previous interval of time required.

Another object of my invention is to provide a chronograph, of the above-indicated character, embodying a thermocouple subjected to the temperature of the body to be tested and a potentiometer having a slide wire, the contour of which shall correspond to the temperature-electromotive-force curve of the couple, in order to compensate automatically for the disproportionate increment or decrement of voltage corresponding to a predetermined increment or decrement of temperature.

Another object of my invention is to provide a chronograph, of the above-indicated character, embodying a recording device having two record producing means that shall operate alternately to permit one of said means to commence its operation, immediately upon the readjustment of the recording device, while the other recording means is returned to its initial position.

Another object of my invention is to provide a chronograph, of the above-indicated character, that shall embody means for heating the body to be tested to attain predetermined increments or decrements of temperature and means for automatically changing the heating of the body and for simultaneously adjusting the position of the recording device.

A further object of my invention is to provide a chronograph of the above-indicated character that shall be simple in construction and effective and reliable in its operation.

The inverse-rate method of thermal analysis consists in noting the time intervals required for a plurality of successive equal increments or decrements in the temperature of a body that is heated at a substantially constant rate. Chemical or allotropic changes occurring in the body, accompanied by an evolution or an absorption of heat, are indicated by an increase or a decrease in the time required for the unit temperature change in the range of temperature within which these variations occur.

The usual manual method for obtaining the thermal analysis of a sample is as follows. The thermocouple is placed in contact with the sample in order to be maintained at the same temperature. Terminals of the thermocouple are connected to a galvanometer through the potentiometer. When the drop of potential across a predetermined portion of the potentiometer balances the terminal electromotive force of the thermocouple, the galvanometer rests in its neutral or zero position.

Assuming that the sample is cooling, the potentiometer is so adjusted with respect to the thermocouple that the electromotive force produced by the thermocouple exceeds a drop of potential between predetermined points of the potentiometer by an amount corresponding to the change in the thermal electromotive force of the couple that will be produced by a change in temperature equal to the desired decrement at the predetermined temperature. That is, the potentiometer is so adjusted that the potential difference between two points thereof will correspond to the electromotive force of the thermocouple at a predetermined temperature thereof, which temperature the thermocouple will have attained when its temperature is decreased by the desired decrement.

Thus, the galvanometer, which is normally deflected, gradually approaches its neutral or zero position as the temperature of the sample decreases. When the galvanometer reaches its zero position, a circuit-closing key is depressed, whereby the time is recorded on a chronograph showing the time required by the temperature of the sample to pass from the initial value to the final value of the decrement of temperature.

The potentiometer is again adjusted to provide a decreased drop of potential, between predetermined points, that shall correspond to the electromotive force of the thermocouple at a temperature less than the previous temperature by a similar equal decrement. Upon the return of the galvanometer to its neutral position, the key is again depressed to record the interval of time required for the temperature of the couple to traverse the decrement of temperature.

The above operation is continued until all the values of the successive intervals of time required for the sample to pass through the predetermined range of temperature are obtained. The record then shows the interval of time required for each successive decrement of temperature. In order to obtain a curve of the analysis, the values of the successive intervals are plotted in their proper order.

Obviously, the manual operation is a laborious process and is subject to personal errors. Moreover, a skilled observer is necessary to operate the key and to readjust the potentiometer after each interval.

A further object of my invention, therefore, is to provide means for accomplishing these results automatically at a single operation and without the attention of an observer.

In practicing my invention, I provide a furnace for heating the sample to be tested whereby a heat zone is produced that has a substantially constant gradient of temperature. By moving the sample within this temperature zone, it may be tested at various temperatures and through a range of temperature between any predetermined values.

I provide also a recording device embodying a movable member upon which is secured a record sheet. Automatically operated recording devices record the intervals of time required for the temperature of the sample to change between predetermined values. The changing of the position of the sample in the temperature zone and the readjustment of the recording device for each successive record are automatically accomplished when the temperature of the sample attains predetermined successive values.

In another embodiment of my invention, the sample is moved through the heat zone at a constant rate of speed, and the adjustment of the recording device for obtaining successive records is controlled in accordance with the temperature of the sample.

Figures 1, 2, 3:
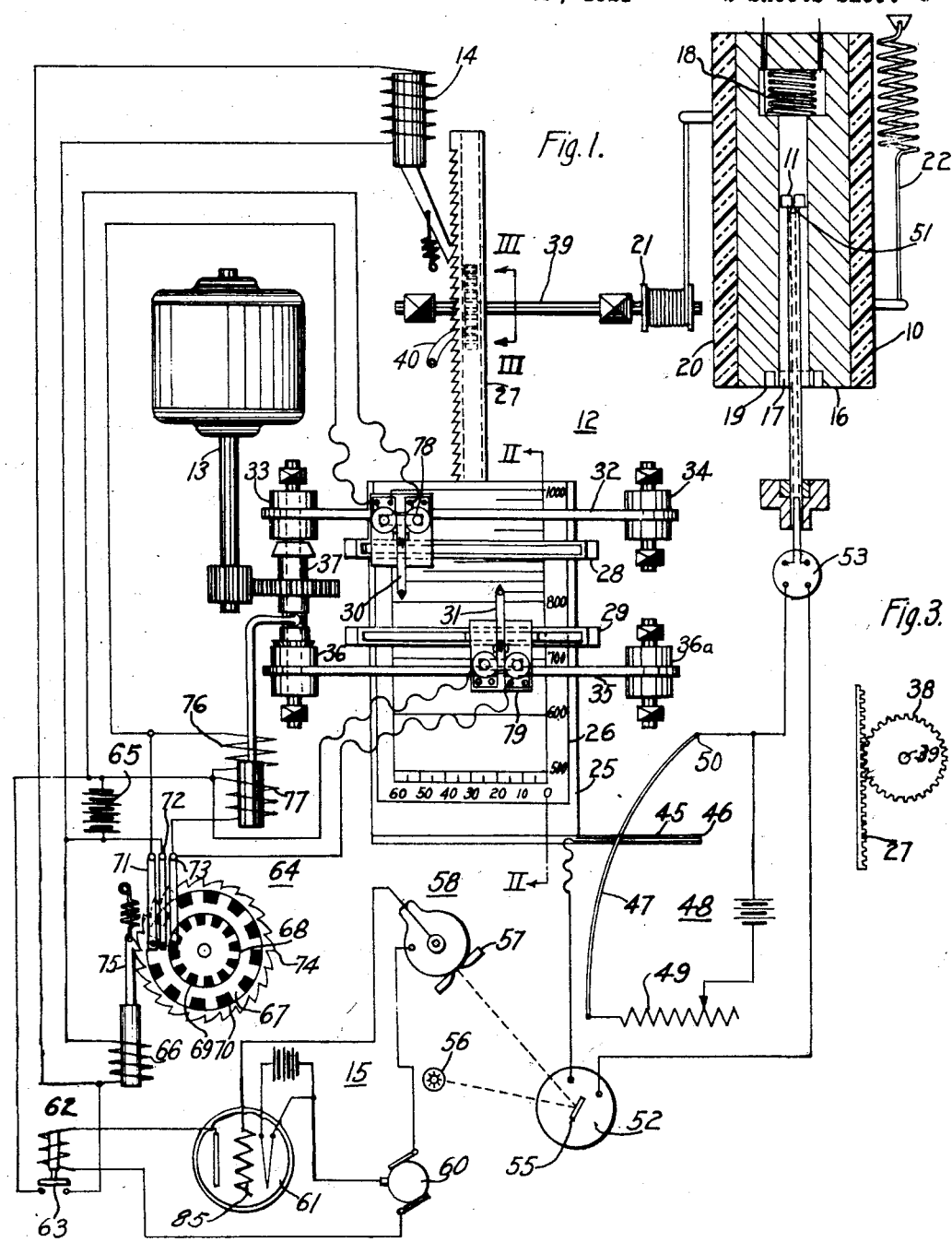
Figure 1 is a diagrammatic view of a recording chronograph embodying my invention.
Fig. 2 is a side view, partially in elevation and partially in section, of the recording device taken along the line II—II in Fig. 1.
Fig. 3 is a side elevational view of the actuating member of the recording device taken along the line III—III in Fig. 1.

Referring to Fig. 1, the chronograph comprises, in general, a furnace 10 for heating a sample 11, a recording device 12 for recording the intervals of time required for the sample to attain successive increments of temperature, a motor 13 and an actuating device 14 to operate the recording device 12. A control system 15 is provided for adjusting the position of the recording device and for controlling the heating of the sample 11 after each record.

The furnace 10 comprises a metallic heat-conducting cylinder 16 surrounding a zone 17 which is to be so heated as to have a constant temperature gradient. A heater 18 is disposed at one end of the zone 17 and a water system 19 is disposed at the other end of the zone 17 to conduct heat from the conducting cylinder 16. A constant temperature gradient is thus maintained between the heater 18 and the heat removing system 19 at the opposite end of the heat zone 17. The heat conducting cylinder is surrounded by a layer of heat-lagging and non-conducting material 20 to prevent excessive radial dissipation of heat from the furnace.

The sample 11 is disposed within the zone 17 and is arranged to be moved periodically or at a constant speed from one end of the zone toward the other end to be subjected to the different temperatures obtaining therein. Relative movement between the sample 11 and the heat zone of the furnace may be obtained by moving the sample within the furnace, and the heat zone, or by maintaining the sample stationary and moving the furnace 10.

As arranged in the system illustrated in Fig. 1, a bobbin 21 is periodically actuated to permit the furnace 10 to be moved longitudinally with respect to the sample 11 by the force of a spring 22. The cooperation of the bobbin 21 and the spring 22 thus maintains the furnace in predetermined positions.

Figure 5:
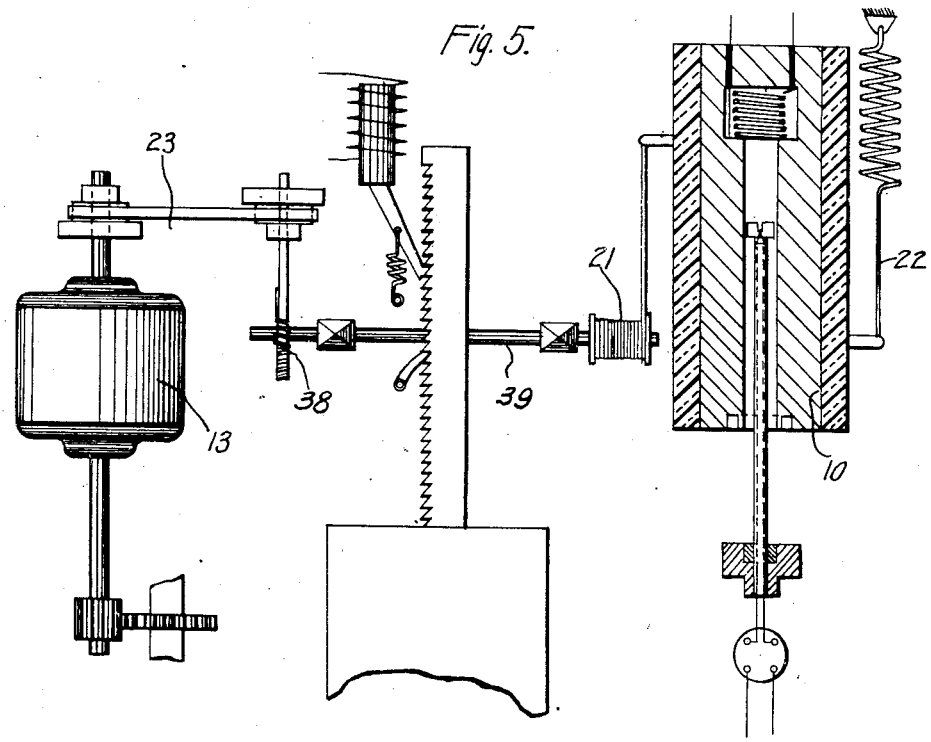
Fig. 5 is a schematic view of a modified form of chronograph embodying my invention, illustrating the control of the sample within the heat zone.
Figure 4:
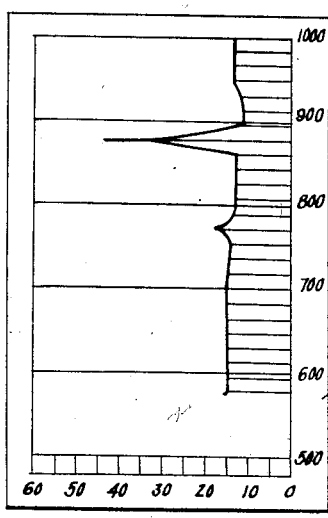
Fig. 4 is a front view of the chart, illustrating a curve resulting from a thermal analysis.

In the system that is illustrated in Fig. 5, the furnace 10 is permitted to be moved by the force of the spring 22 at a constant speed. The rate of movement of the furnace is controlled by a double-cone-pulley mechanism 23 that is directly controlled by a constant-speed motor 13.

The recording device 12 comprises a table 25 upon which is disposed a record sheet 26. A ratcheted arm 27, when actuated by the device 14, is adapted to move the carriage 25 forward a predetermined distance corresponding to a predetermined temperature space interval on the record sheet 26. Disposed transversely with respect to the table 25 are two guide ways 28 and 29 serving to guide two styli 30 and 31, respectively.

The actuation of the stylus 30 is controlled by a tape 32 that is wound between a driven pulley 33 and a spring pulley 34. The stylus 31 is similarly controlled by a tape 35 which is controlled between pulleys 36 and 36$^a$, respectively. The driven pulleys 33 and 36 are controlled by a clutch 37, which is adapted to be moved alternately to engage the pulleys 33 and 36. Upon the release of either pulley 33 or pulley 36 by the clutch 37, the pulleys 34 and 36$^a$ return the styli 30 and 31 to their respective initial positions.

The forward movement of the carriage 25 is controlled by the actuating member 27, and, in the system illustrated in Fig. 1, is accompanied by a corresponding movement of the furnace 10. The actuation of the furnace 10 is also controlled by the actuating member 27 by means of a pinion 38 mounted upon a shaft 39 with the bobbin 21, as illustrated in Fig. 3. A stop member 40 engages the ratchet teeth of the member 27 to prevent the carriage 25 from returning to its initial position.

The carriage 25 also has a laterally disposed arm 45 mounted thereon upon which is mounted a metallic sliding contact member 46 that is insulated from the supporting arm 45. The contact member 46 is adapted to engage a slide wire 47 of a potentiometer 48. The potentiometer circuit may be adjusted by means of a resistor 49 to maintain a predetermined drop of potential across the terminals of the slide wire 47. The forward movement of the carriage 25 automatically moves the contact member 46 forward along the wire 47 to increase the potential difference between one terminal 50 of the slide wire and the contact member 46.

The potential difference between the terminal 50 and the contact member 46 is employed to balance the thermal electromotive force that is developed in a thermocouple 51, that is maintained in contact with the sample 11 which is to be tested. A galvanometer 52 is connected between the contact member 46 and one terminal of the cold junction of the thermocouple 51. The temperature of the cold junction of the thermocouple is maintained constant by a cold-junction box 53. The thermocouple is so arranged with respect to the potentiometer that the galvanometer 52 will balance in its zero or neutral position when the electromotive force of the thermocouple is balanced by the potential difference of the potentiometer.

The galvanometer 52, when in its zero position, initiates the adjustment of the chronograph for a succeeding record by means of the control circuit 15. A mirror 55 is adapted to reflect a beam of light from a source of light 56 through a slit 57 to illuminate the plate of a photoelectric cell 58 when the galvanometer 52 is in its zero or neutral position. The energization of the photoelectric cell 58 initiates the operation of the control circuit 15.

The control circuit 15 comprises a source 60 of electromotive force, an amplifier 61 and a relay 62, the circuit of which is controlled by the amplifier 61. The relay 62 is normally energized to maintain its switch 63 open. The control circuit 15 further includes a controller disc 64 having ratchet teeth whereby it may be operated. The switch 63 is adapted to complete a circuit from a control source 65 for energizing the operating coil 66 of a controller disc 64. The controller disc 64 controls the operation of the clutch 37 of the recording device 12.

The controller disc 64 comprises a sectored ring 67 of conducting material forming a circular zone 68 of continuous conducting material, an inner circular zone 69 and an outer circular zone 70, each of the zones 69 and 70 having alternate portions of conducting material and insulating material. The insulated portions of the inner and the outer circular zones 69 and 70 are staggered with respect to each other.

Three brush-contact members 71, 72 and 73 engage the outer, the central and the inner circular zones 70, 68 and 69, respectively. The controller disc 64 is further provided with a plurality of ratchet teeth 74 that are adapted to be engaged and actuated by an operating pawl member 75.

As the controller disc 64 is moved forward one portion, the switch contact member 72 is alternately electrically connected, through the conducting material of the controller, to the contact members 71 and 73. The electrical connection of the contact members 71 and 72 completes a circuit that energizes an operating coil 76, and the electrical connection of the contact members 72 and 73 completes a circuit for energizing an operating coil 77.

The energization of the operating coil 76 causes the clutch 37 to engage the pulley 33, and the energization of the coil 77 causes the clutch 37 to engage the coil 36.

When the clutch 37 engages the pulley 33 to actuate the stylus 30, the stylus 31 is returned to its initial position by the spring pulley 36ᵃ. Simultaneously with the energization of the coils 76 or 77, the operating coils 78 and 79 of the styli 30 and 31, respectively, are energized. Thus, referring to Fig. 2, it will be observed that the energization of the coils 78 and 79 causes them to actuate their respective styli 30 and 31 to engage the surface of the record sheet 26. Two springs 80 and 81 raise the points of the styli 30 and 31, respectively, to preclude engagement therebetween when they are moving in opposite directions.

This may be effected, since one stylus will be down and the other up while the apparatus is operating. The purpose of employing two styli 30 and 31 is to have one stylus always ready to begin to record the interval of time required for the sample to change from one temperature to another.

Normally, the current traversing the plate circuit of the amplifier 61 is sufficient to energize the coil of the relay 62. The energization of the photoelectric cell 58 completes a circuit through that cell, whereby the grid 85 becomes negatively charged by reason of its being connected, through the cell 58, to the negative terminal of the source 60 of electromotive force. Thus, when the galvanometer 52 assumes its neutral position by reason of the balance between the potential drop of the potentiometer 48 and the electromotive force of the thermocouple 51, the coil 62 becomes sufficiently de-energized to permit the closing of the switch 63. The operating coil 66 of the controller disc 64 and the operating coil of the actuating device 14 are simultaneously energized to move the controller 64 and the carriage 25 to positions for the successive operations. The simultaneous adjustment of the furnace and the consequent change in temperature of the sample 11 causes the unbalance that serves to move the mirror of the galvanometer 52 from its neutral position.

The clutch 37 is moved to the one or the other of its positions to engage the one or the other of operating pulleys 33 and 36 according to whether the coil 76 or the coil 77 is energized. The stylus 30 or the stylus 31 is thereupon actuated transversely across the record sheet 26 to produce a mark thereon. The length of its mark corresponds to the time required for the temperature of the sample to change from one predetermined value of temperature at the beginning of the predetermined increment, or decrement, to the temperature at the end of the predetermined increment or decrement. A curve drawn through the ends of the consecutive marks recorded by the styli 30 and 31 will thus illustrate the thermal analysis of the sample 11.

By shaping the slide wire 47 of the potentiometer 48 to conform to the temperature-electromotive force curve of the thermocouple 11, disproportionate increments or decrements of electromotive force, corresponding to successive equal increments or decrements of temperature, may be compensated for, as against the successive equal forward movements of the slide wire 46 that correspond to predetermined temperature increments or decrements on the record sheet 26.

My invention is not limited to the specific details illustrated or to the specific arrangement thereof, since various modifications may be made therein within the spirit and scope of the invention, as set forth in the appended claims.

I claim as my invention:—

1. A recording chronograph for obtaining a thermal analysis of a sample to be tested, comprising means for heating the sample in accordance with a predetermined constant heat gradient and means for automatically recording the interval of time obtaining between the development of two predetermined temperatures in the sample.

2. A recording chronograph for obtaining a thermal analysis of a sample to be tested, comprising means for heating the sample in accordance with a predetermined constant heat gradient and means for automatically recording the interval of time obtaining between the development of two predetermined temperatures in the sample and means responsive to the temperature of the sample for controlling the heating thereof and the operation of the recording means.

3. A recording chronograph for obtaining a thermal analysis of a sample to be tested, comprising a plurality of alternately-operative mechanisms for drawing parallel-extending lines whose end points determine the locus of a time curve illustrating the rate of change of the temperature of a heated sample between any predetermined temperatures.

4. A recording chronograph for obtaining a thermal analysis of a sample to be tested, comprising means for heating the sample in accordance with a predetermined constant heat gradient and means for automatically recording the interval of time obtaining between the development of two predetermined temperatures in the sample and means for automatically controlling the heating of the sample and the operation of the recording means.

5. A recording chronograph for obtaining a thermal analysis of sample to be tested, comprising means for providing a heat zone having a predetermined constant temperature gradient, means for automatically changing the relative position of the sample in the heat zone and means responsive to the temperature of the sample for controlling the position-changing means.

6. A recording chronograph for obtaining a thermal analysis of a sample to be tested, comprising means for providing a heat zone having a predetermined constant temperature gradient, means for changing the relative position of the sample in the heat zone and temperature responsive means for controlling the position-changing means.

7. A recording chronograph for obtaining a thermal analysis of a sample to be tested, comprising means for providing a heat zone having a predetermined constant temperature gradient, and means for controlling the relative position of the sample in the heat zone.

8. A recording chronograph for obtaining a thermal analysis of a sample to be tested, comprising means for providing a heat zone having a predetermined constant temperature gradient, and means for controlling the relative position of the sample in the heat zone in accordance with the temperature of the sample.

9. A recording chronograph for obtaining a thermal analysis of a sample to be tested, comprising means for providing a heat zone having a predetermined constant temperature gradient, and means responsive to the temperature of the sample for automatically adjusting the relative position thereof in the heat zone.

10. A recording chronograph for obtaining a thermal analysis of a sample to be tested, comprising means for providing a heat zone having a predetermined constant temperature gradient and means responsive to the passage of a plurality of predetermined successive equal increments or decrements of temperature in the sample for controlling the relative position thereof in the heat zone.

11. A recording chronograph for obtaining a thermal analysis of a sample to be tested, comprising means for providing a heat zone having a predetermined constant temperature gradient and means responsive to a predetermined increment or decrement of temperature in the sample for changing the relative position of the sample in the heat zone.

12. A recording chronograph for obtaining a thermal analysis of a sample to be tested, comprising means for providing a heat zone having a predetermined constant temperature gradient and means responsive to a predetermined increment or decrement of temperature in the sample while in one position in the heat zone for controlling the relative movement of the sample to another position in the heat zone.

13. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electro-motive force of the sample at the temperature of the sample, the sample having attained the predetermined increment or decrement in temperature, a galvanometer balanced in its zero position only when the thermocouple electromotive force is balanced by the potentiometer, a photoelectric cell, a source of light, a mirror controlled by the galvanometer to energize the cell when the galvanometer is in a predetermined position and means controlled by the photoelectric cell to control the heating of the sample and the recording means.

14. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electromotive force of the thermocouple at a predetermined temperature of the sample, the sample having attained the predetermined increment or decrement in temperature, and means responsive to a predetermined relation between the thermocouple electromotive force and the potentiometer drop of potential for automatically controlling the recording means.

15. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electromotive force of the thermocouple at a predetermined temperature of the sample, the sample having attained the predetermined increment or decrement in temperature, and means responsive to a predetermined relation between the thermocouple electromotive force and the potentiometer drop of potential for automatically adjusting the position of the recording means and adjusting the effective drop of potential of the potentiometer of a different value corresponding to the electromotive force of the thermocouple at the next predetermined value of temperature, the sample having attained the predetermined increment or decrement in temperature.

16. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electromotive force of the thermocouple at a predetermined temperature of the sample, the sample having attained the predetermined increment or decrement in temperature, and means responsive to a balance between the thermocouple electromotive force and the potentiometer drop of potential for automatically adjusting the position of the recording means.

17. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electromotive force of the thermocouple at a predetermined temperature of the sample, the sample having attained the predetermined increment or decrement in temperature, and means responsive to a balance between the thermocouple electromotive force and the potentiometer drop of potential for automatically adjusting the heating of the sample to develop a different temperature therein corresponding to a predetermined increment or decrement.

18. A recording chronograph for obtaining a thermal analysis of a sample to be tested comprising means for heating the sample between two predetermined degrees of temperature, means for recording the interval of time required by the sample to attain a predetermined increment or decrement in temperature, a thermocouple responsive to the temperature of the sample, a potentiometer automatically adjusted to balance the thermal electromotive force of the sample at the temperature of the sample, the sample having attained the predetermined increment or decrement in temperature, and means responsive to a balance between the thermocouple electromotive force and the potentiometer drop of potential for automatically adjusting the heating of the sample to develop a different temperature therein corresponding to a predetermined increment or decrement and for simultaneously adjusting the effective drop of potential of the potentiometer to a value corresponding to the electromotive force to be developed in the thermocouple after having attained the predetermined increment or decrement in temperature.

19. A potentiometer for balancing the electromotive force developed in a thermocouple comprising a slide wire having a contour corresponding to the temperature-electromotive force curve of the thermocouple and a movable contact member for engaging the slide member and adapted to move in a plane parallel to an axis of the curve.

20. A potentiometer for balancing the electromotive force developed in a thermocouple comprising a slide wire having a contour corresponding to the temperature-electromotive force curve of the thermocouple, means for producing a predetermined drop of potential in the wire and a contact member for the wire movable in a plane parallel to an axis of the curve to compensate for the disproportionate increment or decrement of voltage corresponding to a predetermined increment or decrement of temperature in the thermocouple.

21. A potentiometer for balancing the electromotive force developed in a thermocouple, comprising a slide wire having a contour corresponding to the temperature-electromotive force curve of the thermocouple.

22. The method of compensating for the unequal or disproportionate increments or decrements of electromotive force corresponding to predetermined increments or decrements of temperature in a thermocouple when balancing the thermocouple electromotive force against the potential difference of a potentiometer, which consists in shaping the slide wire of the potentiometer to form a contour corresponding to the temperature electromotive force curve of the thermocouple.

23. A recording chronograph for obtaining a thermal analysis of a sample to be tested, comprising means for heating the sample in accordance with a predetermined constant heat gradient and means comprising a plurality of motor-actuated alternately operative mechanisms for automatically recording the interval of time obtaining between the development of two predetermined temperatures of the sample.

24. A recording chronograph for obtaining a thermal analysis of a sample to be tested, comprising a plurality of alternately-operative mechanisms for making parallel-extending records of successive time intervals corresponding to a plurality of predetermined successive equal increments or decrements of temperature in the sample.

In testimony whereof, I have hereunto subscribed my name this 15th day of March, 1921.

PORTER H. BRACE.